United States Patent [19]

Lederer

[11] 4,224,608

[45] Sep. 23, 1980

[54] SINGLE TERMINAL DETECTION SYSTEM

[75] Inventor: David B. Lederer, Rochester, N.Y.

[73] Assignee: Detection Systems, Inc., Fairport, N.Y.

[21] Appl. No.: 960,464

[22] Filed: Nov. 13, 1978

[51] Int. Cl.$^2$ ............................................ G08B 13/18
[52] U.S. Cl. .................................... 340/556; 250/225; 340/507; 340/600
[58] Field of Search ............... 340/556, 552, 507, 600; 250/225, 578, 395, 340; 343/5 PD, 18 C, 18 B, 100 PE

[56] References Cited

U.S. PATENT DOCUMENTS

| | | | |
|---|---|---|---|
| 3,443,072 | 5/1969 | Mori | 250/225 |
| 3,653,021 | 3/1972 | Litman et al. | 340/556 |
| 3,816,745 | 6/1974 | Primm et al. | 340/556 |
| 3,875,403 | 4/1975 | Svensson | 340/556 |
| 3,944,818 | 3/1976 | Bechtel | 340/556 |

Primary Examiner—Glen R. Swann, III
Attorney, Agent, or Firm—Warren W. Kurz

[57] ABSTRACT

A single terminal detection system of the beam variety is provided with polarizing filters to sense "near-field" problems. One filter polarizes radiation reflected back to the transceiver component and a second filter, positioned within the transceiver, polarizes radiation before it is incident upon one of two radiation detectors. Circuitry, operatively coupled to the detectors, actuates an alarm in the event either an alarm condition or a near-field problem exists.

3 Claims, 3 Drawing Figures

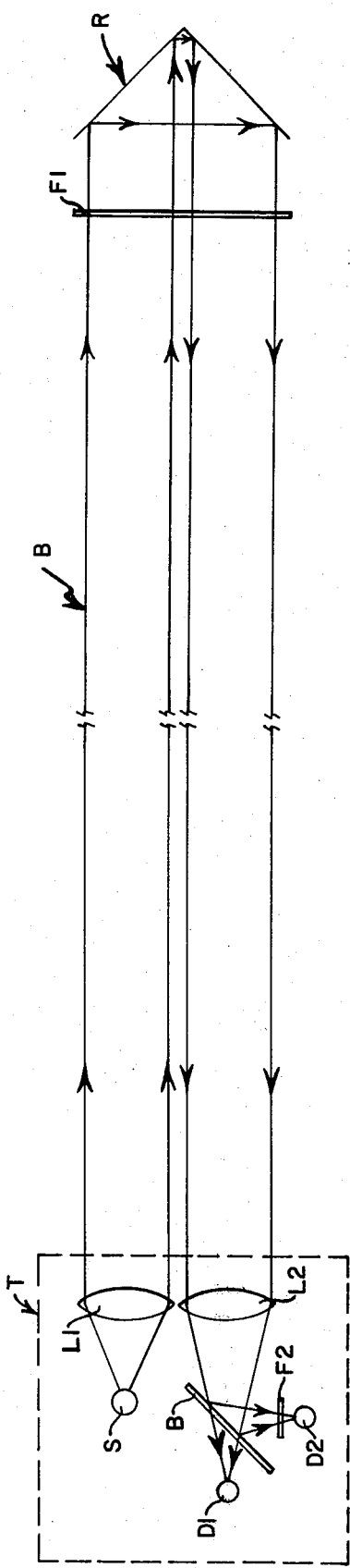
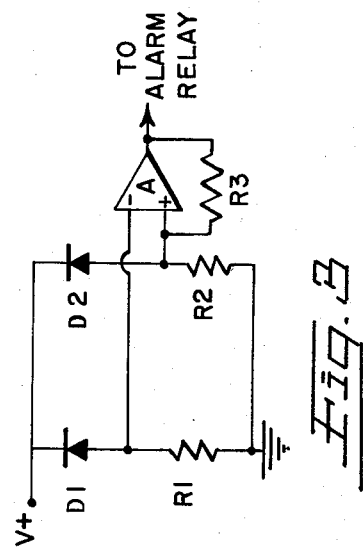
Fig. 1
Fig. 2
Fig. 3
| D1 | D2 | ALARM |
|----|----|-------|
| YES | NO | NO |
| NO | NO | YES |
| YES | YES | YES |
| NO | YES | YES |

SINGLE TERMINAL DETECTION SYSTEM

BACKGROUND OF THE INVENTION

This invention relates to improvements in detection systems of the beam variety, and more particularly, to apparatus for solving the so-called "near-field" problem which characterize such systems.

Single-terminal, beam-type, detection systems, such as intruder detection systems, typically comprise a transceiver unit which transmits a beam of electromagnetic radiation (e.g. visible, infrared or microwave radiation) through a space in which a condition to be sensed is anticipated, and detects the intensity of the beam upon being reflected by a remotely positioned retroreflector. Movement of an intruder through the beam usually results in a sudden reduction or drop-out in the intensity of the received beam. This condition is sensed by conventional threshold-sensing circuitry, and an indication, such as an alarm, is given.

In installing detection systems of the type described above, it is common to set the threshold of the alarm-actuating circuitry at a relatively high level. Typically, the threshold is set at such a level that an alarm will not be sounded unless the intensity of the reflected beam drops to a relatively small percentage of its original intensity, such as, for example, 25% of its original intensity. Such a high margin of error is often necessary to prevent the effects of air turbulence and shimmer produced by thermal gradients between the transceiver unit and the remotely spaced retroreflector from activating the alarm.

Heretofore, intrusion detection systems of the type described above have, under certain circumstances, been unable to detect the movement of an intruder through the beam. For instance, if the intruder crosses the transmitted beam at a location in close proximity to the transceiver, he may reflect sufficient energy back to the transceiver to prevent the alarm-activating threshold from being reached. Whenever the intruder's presence in the beam fails to cause the reflected radiation level at the transceiver to drop below the threshold required for alarm actuation, the system will not detect the intruder's presence. This problem, of course, does not arise when the intruder is substantially removed from the transceiver since, regardless of his reflectivity, he would be incapable of reflecting sufficient radiation back to the receiver as to prevent alarm activation. The severity of this "near-field" problem increases as the intruder's reflectivity increases, as the aforementioned margin of error of the detection system increases, and as the point at which the intruder crosses the beam approaches the transceiver unit.

Another type of near-field problem which adversely effects the performance of intrusion detection systems of the above type is one which results from the use of a poorly collimated beam of radiation. Because safety regulations and other factors often prevent the use of the well-collimated beams of radiation produced by lasers and masers, conventional optical elements and wave guides must be used to control the directionality of the transmitted beam. Unfortunately, such devices allow the transmitted beam to gradually increase in diameter and thereby allow the beam to impinge upon objects between the transceiver and the retroreflector. Thus, it may be appreciated that in installing such systems, care must be taken in aiming the beam of radiation to avoid having radiation impinge upon objects of relatively high reflectivity located in relatively close proximity to the transceiver unit. If the beam strikes a reflective object in close proximity to the transceiver, such object may reflect more radiation back to the receiver than does the remotely spaced reflector, and a total drop-out in return signal from the reflector may not cause the alarm threshold to be reached.

To solve the above-identified near-field problems, it has been common to minimize the field of view of the receiver optics and to deliberately misalign the transmitter and receiver optics so that the reflector is just inside the field of view of the receiver. By this arrangement, radiation reflected by near-field objects will strike the receiver at such an oblique angle as to be outside its field of view. This technique works well in systems in which there is a rigid connection between the transmitter and receiver optics whereby the respective fields of view can be set at the factory. However, new competitive designs often require that the transmitter and receiver optics be independently pointable. This design results in greater flexibility in installations, and less expensive design and fabrication. In installing such systems, it is common for the installer to align the components for maximum signal return. As may be appreciated, such an alignment will not necessarily minimize near-field problems.

In single-terminal photoelectric detection systems having independent transmitter and receiver optics, it is possible to reduce the effects of near-field objects by physically separating such optics. The drawbacks of this approach are twofold. First, the appearance of the system, as well as the packaging thereof, becomes awkward. Secondly, widely spaced optics will not allow operation from a reflector at short range. Over a short range, the spreading of the beam from conventional reflectors may be so small that the return beam may not irradiate the receiver.

SUMMARY OF THE INVENTION

According to the present invention, the aforementioned near-field problems of the prior art single terminal, beam-type detection systems are overcome through the use of a combination of polarizing optics, a receiver having a pair of spaced detectors and certain logic circuitry. In the detection system of the invention, a polarizing filter is positioned adjacent the remotely spaced retroreflector to polarize, in one dimension, radiation returning to the receiver. The receiver comprises a pair of detectors which are positioned to be irradiated by the polarized radiation returning from the reflector. A second polarizing filter is positioned in front of one of such detectors. This second filter acts to polarize radiation in a direction perpendicular to that in which the polarized radiation from the retroreflector is polarized. Logic circuitry is provided for providing an indication signal in the event neither detector is irradiated, indicating the presence of an intruder in the beam, and in the event both detectors are irradiated, indicating the existence of a near-field problem of the types described above.

The objects and advantages of the invention will become more apparent to those skilled in the art from the ensuing detailed description of preferred embodiments, reference being made to the accompanying drawings.

BRIEF DESCRIPTION OF THE DRAWINGS

FIG. 1 is a schematic illustration of a photoelectric detection system according to a preferred embodiment;

FIG. 2 is a truth table; and

FIG. 3 is an electrical schematic of a preferred logic circuit, having the truth table depicted in FIG. 2.

DETAILED DESCRIPTION OF PREFERRED EMBODIMENTS

Referring now to FIG. 1, a single terminal photoelectric detection system embodying the invention is shown schematically as comprising a transceiver T which includes a source S of electromagnetic radiation, and a lens L1 for collimating such radiation to form a relatively narrow beam B. For the sake of illustration, source S will be described as one which emits in the visible portion of the electro-magnetic spectrum. It will be understood, however, that the invention is not wavelength dependent and has equal utility in microwave and infrared detection systems as well.

Collimated light from source S is directed through a region under surveillance to a retroreflector R, such as a corner cube or delineator. The latter serves to return incident source light toward the source. Positioned in front of retroreflector R is a polarizing filter F1 which serves to polarize light transmitted thereby in one direction, for instance, the vertical direction. The fact that the light from the source makes two passes through filter F1 has no effect on the polarization of the light; however, it does reduce the intensity of the light. To minimize light losses, filter F1 can be arranged to cover only one-half of the retroreflector. It should be recognized that the optical trace in FIG. 1 is only intended to illustrate the operation of the system. For most applications, the retroreflector will be spaced so far from the light source that the entire retroreflector will be illuminated and the return beam will spread to the extent that it will cover the entire transceiver. Thus, it would make no difference which half of the retroreflector were covered by the polarizing filter. In one case, the light would be polarized before striking the retroreflector, and in the other case, light would be polarized after striking the retroreflector.

Transceiver T further comprises a pair of light sensitive detectors D1 and D2 which may comprise, for instance, photodiodes. Polarized light from the retroreflector is focused on these detectors by lens L2. A beam splitter B serves to redirect approximately 50% of the received light energy toward detector D2. A second polarizing filter F2 is positioned in front of detector D2. Filter D2 is so oriented as to polarize light in a direction perpendicular to that in which filter F1 polarizes light. The result is that substantially no light is incident upon detector D2 under normal operating conditions.

Under normal operating conditions, i.e. a non-obstructed beam, the vertically polarized light from the retroreflector will illuminate only detector D1. Under this condition, no alarm should be given. When the light beam is obstructed, such as by an intruder's presence, neither detector will be illuminated, and an alarm should be given. When a near-field problem of either of the aforementioned types exists (i.e. an object of relatively high reflectivity intercepts the beam at a point relatively close to the transceiver, or a stationary object positioned in the beam reflects so much light back to the transceiver that a complete drop-out in the light reflected from the retroreflector would go undetected), both detectors will be illuminated because the light reflected by either the moving or stationary object will be unpolarized. Here again, an alarm should be given to either indicate that the beam has been intercepted, or to alert the system installer that the beam is not optionally directed. When detector D2 provides an output signal and detector D1 does not, an alarm should be given to alert the installer that detector D1 is probably not operational. A truth table for the system is provided in FIG. 2. The words "yes" and "no" refer to the presence or absence, respectively, of an output signal from the detectors D1 and D2.

Referring to FIG. 3, preferred circuitry for satisfying the truth table of FIG. 2 is illustrated schematically. As shown, the outputs of two photodiodes P1, P2 serve as the inputs to a conventional differential amplifier A. Resistors R1 and R2 are detector load resistors, and resistor R3 is a feedback resistor which provides positive feedback causing the amplifier output to remain high (in terms of voltage) except when P1 is conducting and P2 is not. For most applications, the resistance of R3 is much larger than R1 or R2. The combination of R2 and R3 sets the threshold which the signal through P1 must exceed in order to produce a non-alarming condition (i.e. the first condition in the truth table of FIG. 2).

The invention has been described in detail with particular reference to certain preferred embodiments thereof, but it will be understood that variations and modifications can be effected within the spirit and scope of the invention.

I claim:

1. A detection system comprising:
   (a) means for transmitting radiant energy through a region under surveillance;
   (b) means for polarizing said energy in one dimension;
   (c) reflecting means for redirecting radiant energy transmitted by said transmitting means;
   (d) means for receiving polarized radiant energy upon being redirected by said reflecting means, said receiving means being positioned proximate said transmitting means and comprising first and second radiation-sensitive transducer means, each being positioned to be irradiated by said polarized energy and being adapted to produce an electric signal proportional to the irradiation received thereby;
   (e) filter means for polarizing radiant energy in a dimension perpendicular to said one dimension, said filter means being positioned in the optical path between said transmitting means and said first transducer means; and
   (f) circuit means operatively coupled to said first and second transducers for providing an alarm signal in the event both transducers produce electric signals, or in the event neither transducer produces an electric signal.

2. The detection system according to claim 1 wherein said circuit means functions further to provide an alarm signal in the event that only said first transducer produces an electric signal.

3. The detection system according to claim 1 wherein said transmitting and receiving means share a common housing.

* * * * *